US012738484B2

(12) United States Patent
Li et al.

(10) Patent No.: US 12,738,484 B2
(45) Date of Patent: Sep. 15, 2026

(54) METHOD FOR SURFACE MODIFICATION OF LITHIUM TRANSITION METAL OXIDE POSITIVE ELECTRODE MATERIAL

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Bin Li, Foshan (CN); Changdong Li, Foshan (CN); Weijian Liu, Foshan (CN); Xingyu Wu, Foshan (CN); Dingshan Ruan, Foshan (CN); Yong Cai, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 442 days.

(21) Appl. No.: 18/682,434

(22) PCT Filed: Apr. 29, 2022

(86) PCT No.: PCT/CN2022/090538

§ 371 (c)(1),
(2) Date: Feb. 8, 2024

(87) PCT Pub. No.: WO2023/040287

PCT Pub. Date: Mar. 23, 2023

(65) Prior Publication Data

US 2024/0351911 A1 Oct. 24, 2024

(30) Foreign Application Priority Data

Sep. 18, 2021 (CN) .......................... 202111101885.0

(51) Int. Cl.
*H01M 4/485* (2010.01)
*C01G 51/50* (2025.01)
(Continued)

(52) U.S. Cl.
CPC ............ *H01M 4/485* (2013.01); *C01G 51/50* (2013.01); *H01M 4/131* (2013.01);
(Continued)

(58) Field of Classification Search
CPC .... C01G 51/50; H01M 4/131; H01M 4/1391; H01M 4/485; H01M 4/505; H01M 4/525; H01M 4/5825
See application file for complete search history.

(56) References Cited

FOREIGN PATENT DOCUMENTS

| | | | |
|---|---|---|---|
| CN | 108807981 | A | 11/2018 |
| CN | 111525118 | A | 8/2020 |

(Continued)

OTHER PUBLICATIONS

English Machine Translation of CN112086679 (Year: 2020).*
International search report of PCT Patent Application No. PCT/CN2022/090538 issued on Jul. 18, 2022.

*Primary Examiner* — Kourtney R S Carlson
(74) *Attorney, Agent, or Firm* — Westbridge IP LLC

(57) ABSTRACT

Disclosed in the present invention is a method for surface modification of a lithium transition metal oxide positive electrode material, including: adding a first additive, a second additive, and a lithium transition metal oxide to water to obtain a first slurry, the first additive being a lithium-containing phosphate, and the second additive being an acidic solution of a $Y^{3+}$ or $Al^{3+}$ salt; dropwise adding a
(Continued)

third additive to the first slurry to obtain a second slurry, the third additive being an acidic solution of a $TiO^{2+}$ or $ZrO^{2+}$ salt; dropwise adding a fourth additive to the second slurry to obtain a third slurry, the fourth additive being an acidic solution of a $AlO_2^-$ salt; and performing centrifugation and drying on the third slurry to obtain an intermediate product, mixing the intermediate product with a large-particle positive electrode material, and performing sintering to obtain a surface-modified lithium transition metal oxide material.

9 Claims, 3 Drawing Sheets

(51) Int. Cl.
*H01M 4/131* (2010.01)
*H01M 4/1391* (2010.01)
*H01M 4/505* (2010.01)
*H01M 4/525* (2010.01)
*H01M 4/58* (2010.01)

(52) U.S. Cl.
CPC ......... *H01M 4/1391* (2013.01); *H01M 4/505* (2013.01); *H01M 4/525* (2013.01); *H01M 4/5825* (2013.01); *C01P 2004/03* (2013.01); *C01P 2004/51* (2013.01); *C01P 2006/40* (2013.01); *C01P 2006/80* (2013.01)

(56) References Cited

FOREIGN PATENT DOCUMENTS

CN 112086679 A 12/2020
CN 112086679 B * 2/2022 ............ H01M 4/525

* cited by examiner

METHOD FOR SURFACE MODIFICATION OF LITHIUM TRANSITION METAL OXIDE POSITIVE ELECTRODE MATERIAL

TECHNICAL FIELD

The present application relates to the technical field of lithium-ion batteries, and in particular to a method for surface modification of a lithium transition metal oxide cathode material.

BACKGROUND

A lithium-ion battery has higher capacity, discharge plateau and compaction density, which is one of the most fully studied and widely used cathode materials for the commercial lithium-ion battery. Currently, the common layered lithium-ion batteries include lithium cobalt oxide, low-nickel lithium nickel cobalt manganese oxide and high-nickel lithium nickel cobalt manganese oxide, etc. The lithium cobalt oxide is widely used in 3 C fields including a mobile phone, an unmanned aerial vehicle, and a notebook computer, and the lithium nickel cobalt manganese oxide is widely used in the field of new energy vehicles.

Residual alkali generally refers to residual soluble $Li_2CO_3$ and LiOH on a surface of a lithium transition metal oxide powder material. The problem of residual alkali has a great impact on the battery. In the process of making and coating slurry for a rechargeable battery, the high residual alkali content may make the slurry unstable, accelerate the gelation of the slurry, and reduce the uniformity of the battery. In addition, the residual alkali on the surface of the cathode material is liable to react with the electrolytic solution so as to cause the generation of gas, which reduces the safety performance and the cycle performance of the battery. There are two main sources of the residual alkali on the surface of the lithium transition metal oxide powder material. First, during the production process, a lithium salt may volatilize during the high-temperature calcination process, and in order to compensate for the loss of Li during the calcination process, a mixing ratio Li/M (M refers to a transition metal) is generally greater than 1, so that the high-temperature conditions of calcination make a small amount of remaining Li exist in the form of $Li_2O$. During the subsequent cooling process, $Li_2O$ may react with $CO_2$ and $H_2O$ in the air to produce $Li_2CO_3$ and LiOH. Second, the active oxygen anions on the surface of the lithium transition metal oxide cathode material may react with $CO_2$ and $H_2O$ in the air to produce $CO_3^{2-}$ and $OH^-$. A small amount of $Li^+$ migrates from a body to the surface and produces $Li_2CO_3$ and LiOH with $CO_3^{2-}$ and $OH^-$ on the surface of the material, and this process is accompanied by deoxidation of the surface of the material to form a surface oxide layer with a distorted structure. During the cycle of the battery, the residual alkali on a surface layer of the particles easily reacts with the electrolytic solution to produce gas. The more residual alkali on the surface layer of the material is, the higher the cycle ambient temperature or the voltage is, and thus the more obvious the phenomenon of gas generation is.

Currently, the method for removing the residual lithium on the surface of a high-nickel lithium nickel cobalt manganese oxide material is mainly by water washing and drying. The residual lithium on the surface is removed by water washing with the soluble characteristics of $Li_2CO_3$ and LiOH, and the residual water is removed by heating and drying. However, the process of water washing may increase the cost of use. More importantly, the lithium transition metal oxide material is sensitive to water. If the drying time is too long and the contact time between the material and the water is too long, the lattice lithium on the surface may be lost, which may lead to deterioration of the material structure and serious performance degradation. High-voltage lithium cobalt oxide itself has a lower residual alkali content, while the surface activity is enhanced under high-temperature and high-voltage, and much residual lithium on the surface of the material may also increase side reactions, which may lead to irreversible capacity loss of the battery, acceleration of the cycle attenuation and flatulence of the battery accompanied with cobalt dissolution and oxygen precipitation. In addition, a series of safety hazards may occur.

By coating other material on the surface of the lithium transition metal oxide material, the amount of the residual alkali on the surface layer of the cathode material can be effectively reduced, the generation of gas can be reduced, and the structural stability and the cycle performance are improved. The common coating materials are metal oxides, such as $Al_2O_3$, $La_2O_3$, $TiO_2$ or $ZrO_2$. A common coating method is solid-phase coating method, and such coating method can stabilize the structure, and reduce the residual lithium, which performs the function of protecting the cathode material. However, most pure oxides are electronically insulated, and the coating may increase the electronic conductance impedance of the cathode material and reduce the capacity. In addition, the solid-phase coating has the problem of non-uniform coating and increase of the BET of the surface layer, which increases the battery impedance and reduces the capacity. Although the residual alkali on the surface is reduced, the capacity is affected.

SUMMARY

The present application is directed to solve at least one of the above-described technical problems existing in the prior art. For this, a method for surface modification of a lithium transition metal oxide cathode material is provided according to the present application, which can effectively reduce the alkali on a surface of the lithium transition metal oxide cathode material, improve the stability of an interface, improve a voltage cycle capacity, improve the compaction density and improve the energy density.

According to one aspect of the present application, a method for surface modification of a lithium transition metal oxide cathode material is provided, which includes the following steps:

S1: adding a first additive, a second additive and a lithium transition metal oxide into water and stirring to obtain a first slurry; where the first additive is a lithium-containing phosphate, and the second additive is an acidic solution of $Y^{3+}$ salt or $Al^{3+}$ salt;

S2: adding a third additive dropwise into the first slurry and stirring to obtain a second slurry, where the third additive is an acidic solution of $TiO^{2+}$ salt or $ZrO^{2+}$ salt;

S3: adding a fourth additive dropwise into the second slurry and stirring to obtain a third slurry, where the fourth additive is an alkaline solution of $AlO_2^-$ salt; and S4: centrifuging the third slurry and drying to obtain an intermediate product; mixing the intermediate product with a large-particle cathode material and sintering to obtain a surface-modified lithium transition metal oxide material.

In some embodiments of the present application, an addition amount of the first additive is 0.1% to 5% of a mass of the lithium transition metal oxide, a molar ratio of $Li^+$ in the first additive, to $Y^{3+}$ or $Al^{3+}$ in the second additive, to $TiO^{2+}$ or $ZrO^{2+}$ in the third additive and to $AlO_2^-$ in the fourth additive is (0.1-0.5):(0.5-1.5):(0.5-1.5):(2.5-7.5).

In some embodiments of the present application, a chemical formula composition of the lithium transition metal oxide is $LiCo_xM_{1-x}O_2$, wherein M represents at least one of Mn, Al, Zr, Ti, Mg, La, Ni or Mg, and 1≥x≥0.10. The lithium transition metal oxide refers to a powder material obtained by sintering a precursor and a lithium source for the first time to obtain a block material with a conventional process, and pulverizing the block material, with a particle size Dv50 ranging from 3 μm to 22 μm.

In some embodiments of the present application, in step S1, a solid-liquid mass ratio of the lithium transition metal oxide to water is 1:(0.2-4), and more preferably 1:1.2.

In some embodiments of the present application, in step S1, the lithium-containing phosphate is at least one of lithium-containing orthophosphate, lithium-containing hydrogen phosphate, or lithium-containing metaphosphate, and more preferably at least one of lithium-containing orthophosphate and lithium-containing metaphosphate.

In some embodiments of the present application, the acidic solution in the second additive and/or the third additive is at least one selected from the group consisting of sulfuric acid solution, hydrochloric acid solution, acetic acid solution, nitric acid solution, citric acid solution or oxalic acid solution.

In some embodiments of the present application, in step S1, a stirring speed ranges from 100 r/min to 300 r/min, and a stirring time ranges from 5 min to 30 min.

In some embodiments of the present application, in step S2, a stirring speed ranges from 100 r/min to 1000 r/min, and a stirring time ranges from 5 min to 30 min.

In some embodiments of the present application, the alkaline solution in the fourth additive is at least one selected from the group consisting of sodium hydroxide solution, potassium hydroxide solution, lithium hydroxide solution or aqueous ammonia solution.

In some embodiments of the present application, a concentration of $Y^{3+}$ or $Al^{3+}$ in the second additive ranges from 0.001 mol/L to 0.3 mol/L; a concentration of $TiO^{2+}$ or $ZrO^{2+}$ in the third additive ranges from 0.002 mol/L to 0.4 mol/L; and a concentration of $AlO_2^-$ in the fourth additive ranges from 0.001 mol/L to 0.3 mol/L.

In some embodiments of the present application, the large-particle cathode material is at least one of lithium cobalt oxide, high-nickel lithium nickel cobalt manganese oxide and low-nickel lithium nickel cobalt manganese oxide; a particle size Dv50 of the large-particle cathode material ranges from 10 μm to 22 μm; and a mass ratio of the intermediate product to the large-particle cathode material is (2-10):1, and more preferably (3-9):1.

In some embodiments of the present application, in step S4, a temperature for the sintering ranges from 600 degrees Celsius to 950 degrees Celsius; preferably, a time for the sintering ranges from 5 h to 10 h.

In some embodiments of the present application, in step S4, a centrifugation speed ranges from 1000 r/min to 3000 r/min.

In some embodiments of the present application, a time for dropwise adding the third additive and the fourth additive ranges from 3 min to 10 min.

In some embodiments of the present application, in step S4, the drying is vacuum drying, and a drying temperature ranges from 100 degrees Celsius to 110 degrees Celsius, a drying time ranges from 3 h to 10 h, and a vacuum degree is maintained ranging from −0.02 MPa to −0.4 MPa.

In some embodiments of the present application, in step S4, a mixing rate ranges from 300 r/min to 1000 r/min, and a mixing time ranges from 5 min to 30 min.

According to a preferred example of the present application, at least the following beneficial effects are obtained.

1. A liquid-phase surface modification is adopted according to the present application, lithium ions, phosphate ions or metaphosphate ions is introduced in the liquid-phase coating process of the lithium transition metal oxide, which can inhibit the precipitation of lithium ions in the structure of the lithium transition metal oxide to a certain extent, and effectively reduce the source of residual alkali, and stabilize a structure of a matrix of the surface layer.
2. Additives are added stepwise and hydrolyzed synchronously, and substances such as $Al(OH)_3$ and $Zr(OH)_4$ or $Ti(OH)_4$ and $Al(OH)_2PO_3$ complexes are formed and distributed uniformly on the surface of the material, so as to avoid excessive contact time between the material and the water and improve the lack of lattice lithium on the surface.
3. The method of grading large and small particles is adopted, the intermediate product and the large particle are mixed and then sintered at a high temperature, and the hydroxide and complexes are in dehydration to obtain a coating layer by $Al_2O_3$ and $TiO_2$ or $ZrO_2$ and $Al(PO_3)_3$ with a uniform composition and a controllable thickness. The coating layer is compact and smooth, which can effectively reduce the residual alkali content on the surface. In addition, the presence of amphiphilic substances on the surface layer can improve the generation of gas, and increase the compaction density and energy density.
4. The coating layer according to the present application has a uniform composition and a controllable thickness, which can improve the surface non-uniformity of the solid-phase structure, reduce the BET of the interface, reduce the contact area of the interface and the electrolytic solution, reduce the occurrence of the side reactions, produce a substance with a spinel structure on the surface of the material during the cycle process, improve the high-voltage resistance of the material, and improve the cycle performance of the lithium transition metal oxide cathode material.

BRIEF DESCRIPTION OF DRAWINGS

The present application will be further described hereinafter in conjunction with the drawings and examples, in which.

DETAILED DESCRIPTION OF EMBODIMENTS

Hereinafter, the concept and the generated technical effects of the present application will be described clearly and completely with reference to the examples, so as to fully understand the purpose, features and effects of the present application. Obviously, the described examples are only a part of the examples of the present application, rather than all the examples, Based on the examples of the present application, any other examples, made by the person skilled in the art without any creative efforts, will fall into the protection scope of the present application.

EXAMPLE 1

In this example, a surface-modified lithium transition metal oxide cathode material is prepared, and the specific process is as follows:

(1) 50 kg of deionized water is poured into a washing kettle, and a first additive $LiPO_3$ and a sulfuric acid solution of a second additive $Al_2(SO_4)_3$ with a concentration of $Al^{3+}$ of 0.2 mol/L therein are added into the deionized water and stirred uniformly, and then a $LiCoO_2$ primary sintered powder material (a particle size Dv50 is 8 μm) is added in the deionized water with a solid-liquid mass ratio of 1:0.8, and an addition amount of the first additive is 0.02 wt % of the mass of the added $LiCoO_2$ primary sintered powder material, so that a uniform first slurry is formed by stirring at a high speed of 200 r/min;

(2) a $TiOSO_4$ sulfuric acid solution with a concentration of $TiO^{2+}$ of 0.2 mol/L is added dropwise into the first slurry, and a time for dropwise adding is controlled at 5 min, and stirring is performed at a high speed of 500 r/min for 10 min after dropwise adding is completed, so as to obtain a second slurry;

(3) a $NaAlO_2$ sodium hydroxide solution with a concentration of $AlO_2^-$ of 0.3 mol/L is added dropwise into the second slurry, and a time for dropwise adding is controlled at 10 min, and stirring is performed at a high speed of 500 r/min for 10 min after dropwise adding is completed, so as to obtain a third slurry, the second additive, the third additive and the fourth additive are added with an amount of $Li^+:Al^{3+}:TiO^{2+}:AlO_2^-=0.5:1:1:2.5$ based on the addition amount of the first additive; and (4) the third slurry is placed in a high-mixing drying equipment for vacuum drying after centrifugation and separation, where a rotation speed for high-mixing is 10 r/min, a drying temperature is 105 degrees Celsius; a drying time is 8 h, and a vacuum degree is set to −0.05 MPa; the dried material is mixed with $LiCoO_2$ with a particle size Dv50 of 18 μm at a high speed of 500 r/min, a time of 15 min, a ratio of 8:1, which are placed in a box furnace, ventilated with compressed air having a ventilation volume of 5 $m^3$/h, and are heated to 850 degrees Celsius and maintained at this temperature for 8 h, and cooled naturally to room temperature, so as to obtain a $LiCoO_2$ material coated with $TiO_2$, $Al_2O_3$ and $Al(PO_3)_3$.

Figure 1:
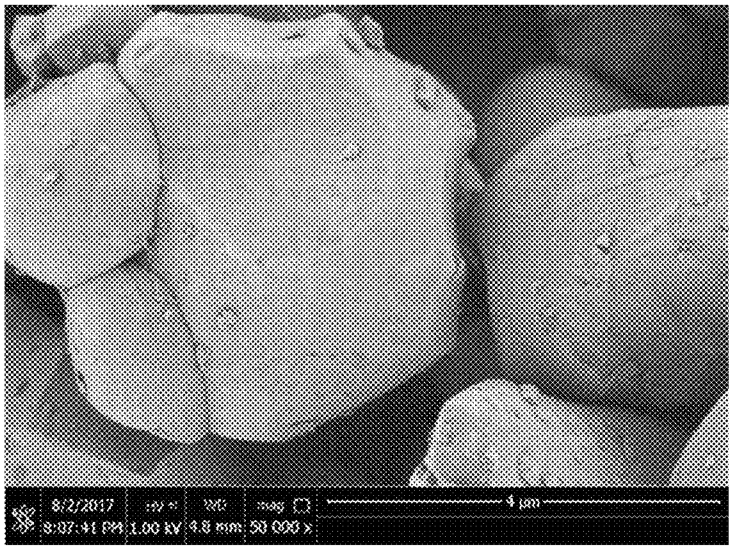
FIG. 1 is an SEM image of a material of a third slurry after being dried in Example 1 of the present application.
Figure 2:
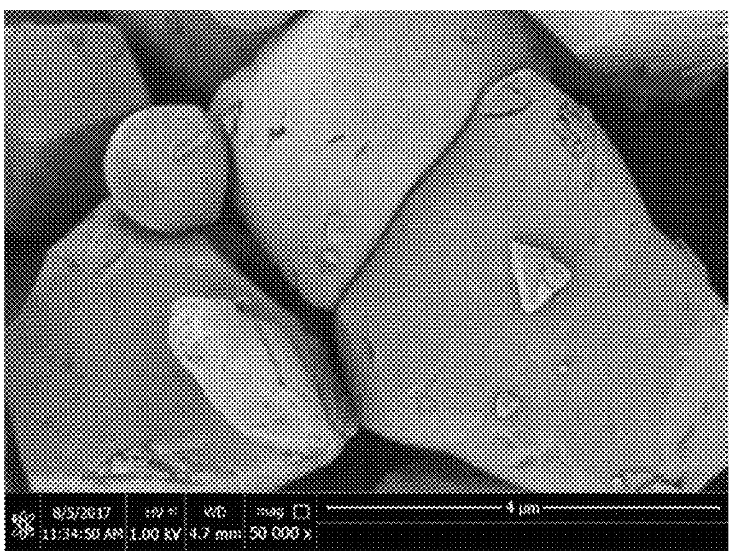
FIG. 2 is an SEM image of a material after being sintered in Example 1 of the present application.

FIG. 1 is an SEM image of the material of the third slurry after centrifugation and being dried, and it can be seen from the SEM that there are apparent traces of uniform coating on the surface layer of the material; and FIG. 2 is an SEM image of the material after being sintered, and it can be seen from FIG. 2 that the surface becomes smooth and dense after sintering is completed.

EXAMPLE 2

In this example, a surface-modified lithium transition metal oxide cathode material is prepared, and the specific process is as follows:

(1) 50 kg of deionized water is poured into a washing kettle, and a first additive $Li_3PO_3$ and a sulfuric acid solution of a second additive $Al_2Cl_3$ with a concentration of $Al^{3+}$ of 0.1 mol/L therein are added into the deionized water and stirred uniformly, and then a $LiCoO_2$ primary sintered powder material (a particle size Dv50 is 10 μm) is added in the deionized water with a solid-liquid mass ratio of 1:3, and an addition amount of the first additive is 0.01 wt % of the mass of the added $LiCoO_2$ primary sintered powder material, so that a uniform first slurry is formed by stirring at a high speed of 300 r/min;

(2) a $TiOSO_4$ sulfuric acid solution with a concentration of $TiO^{2+}$ of 0.1 mol/L is added dropwise into the first slurry, and a time for dropwise adding is controlled at 7 min, and stirring is performed at a high speed of 500 r/min for 10 min after dropwise adding is completed, so as to obtain a second slurry;

(3) a $NaAlO_2$ sodium hydroxide solution with a concentration of $AlO_2^-$ of 0.3 mol/L is added dropwise into the second slurry, and a time for dropwise adding is controlled at 8 min, and stirring is performed at a high speed of 500 r/min for 10 min after dropwise adding is completed, so as to obtain a third slurry, the second additive, the third additive and the fourth additive are added with an amount of $Li^+:Al^{3+}:TiO^{2+}:AlO_2^-=0.3:1:1:3$ based on the addition amount of the first additive; and (4) the third slurry is placed in a high-mixing drying equipment for vacuum drying after centrifugation and separation, where a rotation speed for high-mixing is 10 r/min, a drying temperature is 110 degrees Celsius; a drying time is 3 h, a vacuum degree is set to −0.04 MPa; the dried material is mixed with $LiCoO_2$ with a particle size Dv50 of 18 μm at a high speed of 300 r/min, a time of 10 min, a ratio of 6:1, which are placed in a box furnace, ventilated with compressed air having a ventilation volume of 5 $m^3$/h, and are heated to 800 degrees Celsius and maintained at this temperature for 8 h, and cooled naturally to room temperature, so as to obtain a $LiCoO_2$ material coated with $TiO_2$, $Al_2O_3$ and $Al(PO_3)_3$.

EXAMPLE 3

In this example, a surface-modified lithium transition metal oxide cathode material is prepared, and the specific process is as follows:

(1) 50 kg of deionized water is poured into a washing kettle, and a first additive $Li_3PO_3$ and a sulfuric acid solution of a second additive $Y_2(SO_4)_3$ with a concentration of $Y^{3+}$ of 0.05 mol/L therein are added into the deionized water and stirred uniformly, and then a $LiNi_{0.85}Co_{0.10}Mn_{0.05}O_2$ (a particle size Dv50 is 3 μm) powder material is added with a solid-liquid mass ratio of the high-nickel ternary material primary sintered powder material (a particle size Dv50 is 3 μm) and deionized water of 1:5, an addition amount of the first additive is 0.01 wt % of the mass of the added primary sintered powder material, so that a uniform first slurry is formed by stirring at a high speed of 200 r/min;

(2) a $ZrOSO_4$ sulfuric acid solution with a concentration of $ZrO^{2+}$ of 0.05 mol/L is added dropwise into the first slurry, and a time for dropwise adding is controlled at 6 min, and stirring is performed at a high speed of 500 r/min for 10 min after dropwise adding is completed, so as to obtain a second slurry;

(3) a $NaAlO_2$ sodium hydroxide solution with a concentration of $AlO_2^-$ of 0.2 mol/L is added dropwise into the second slurry, and a time for dropwise adding is controlled at 10 min, and stirring is performed at a high speed of 500 r/min for 10 min after dropwise adding is completed, so as to obtain a third slurry, the second additive, the third additive and the fourth additive are added with an amount of $Li^+$:$Y^{3+}$:$ZrO^{2+}$:$AlO_2^-$=0.3:1:1:5 based on the addition amount of the first additive; and (4) the third slurry after centrifugation and separation is placed in a high-mixing drying equipment for vacuum drying, where a rotation speed for high-mixing is 10 r/min, a drying temperature is 120 degrees Celsius; a drying time is 3 h, a vacuum degree is set to −0.05 MPa; the dried material is mixed with a $LiNi_{0.85}Co_{0.10}Mn_{0.05}O_2$ high-nickel ternary material of large particle with a particle size Dv50 of 10 μm at a high speed of 50 r/min, a time of 20 min, a ratio of 7:1, which are protected by nitrogen during the mixing process, the mixture is placed in a muffle furnace, and is heated to 600 degrees Celsius for 3 h under an oxygen environment, and cooled naturally to room temperature, so as to obtain a $LiNi_{0.85}Co_{0.10}Mn_{0.05}O_2$ high-nickel ternary material coated with $ZrO_2$, $Y_2O_3$ and $Al(PO_3)_3$.

Comparative Example 1

In this comparative example, the $LiCoO_2$ powder material in Example 1 is mixed uniformly with nano $Al_2O_3$, nano $TiO_2$ and nano $LiPO_3$ at a high speed, the addition amounts of Ti element, Al element and $LiPO_3$ are the same with those in Example 1, the box furnace is ventilated with compressed air having a ventilation volume of 5 $m^3$/h, and is heated to 850 degrees Celsius and maintained at this temperature for 8 h, and cooled naturally to room temperature, so as to obtain a $LiCoO_2$ material coated with $TiO_2$, $Al_2O_3$ and $Al(PO_3)_3$.

Figure 3:
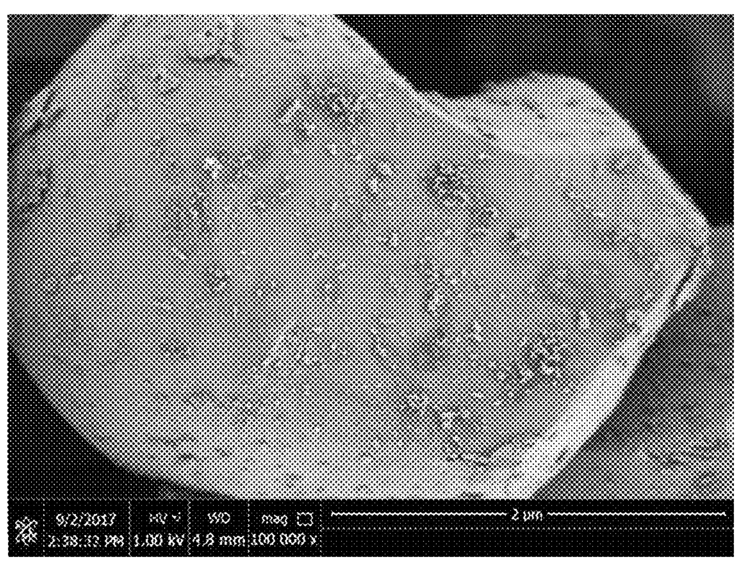
FIG. 3 is an SEM image of a material after being dry mixed in Comparative Example 1 of the present application.
Figure 4:
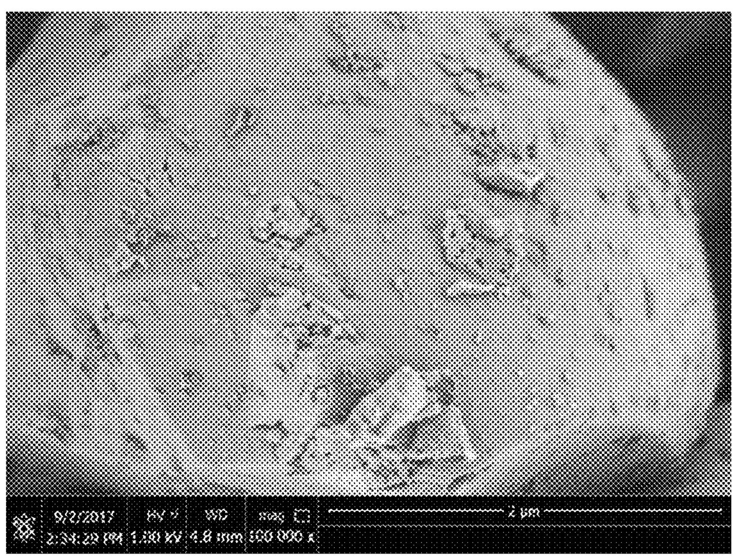
FIG. 4 is an SEM image of a material after being dry mixed and sintered in Comparative Example 1 of the present application.

FIG. 3 is an SEM image of a material after being dry mixed of the present comparative example. It can be seen from the figure that there are relatively more large particles in the surface layer which are dispersed non-uniformly after be dry mixed. FIG. 4 is an SEM image of a finished product after being sintered of the present comparative example. It can be seen from the figure that there are particulate substances on the surface layer of the material apparently.

Comparative Example 2

In this comparative example, $LiPO_3$ is not added at step (1) of Example 1, and $TiOSO_4$ sulfuric acid solution, $Al_2(SO_4)_3$ sulfuric acid solution and $NaAlO_2$ sodium hydroxide solution are directly added, a lithium cobalt oxide of large particle is not added at step (4), and other addition amounts and steps are the same with those in Example 1, so as to obtain a $LiCoO_2$ material coated with $TiO_2$ and $Al_2O_3$.

Comparative Example 3

In this comparative example, the $LiNi_{0.85}Co_{0.10}Mn_{0.05}O_2$ primary powder in Example 3 is mixed uniformly with nano $Al_2O_3$, nano $TiO_2$ and nano $LiPO_3$ at a high speed after water washing, centrifugation and drying, the addition amount of Ti element, Al element, and $LiPO_3$ and the large particle is the same with those in Example 3, the box furnace is ventilated with compressed air having a ventilation volume of 5 $m^3$/h, and is heated to 600 degrees Celsius and maintained at this temperature for 3 h, and cooled naturally to room temperature, so as to obtain a $LiNi_{0.85}Co_{0.10}Mn_{0.05}O_2$ material coated with $TiO_2$, $Al_2O_3$ and $Al(PO_3)_3$.

Comparative Example 4

In Comparative Example 4, an $Al_2(SO_4)_3$ sulfuric acid solution is not added at step (1) of Example 1, and $TiOSO_4$ sulfuric acid solution, $LiPO_3$ solution and $NaAlO_2$ sodium hydroxide solution are directly added, and the addition amounts and other steps are the same with those in Example 1.

Comparative Example 5

In Comparative Example 5, $TiOSO_4$ sulfuric acid solution is not added at step (2) of Example 1, only $NaAlO_2$ sodium hydroxide solution is added, a lithium cobalt oxide of large particle is not added at step (4) and the addition amounts and other steps are the same with those in Example 1.

Comparative Example 6

In Comparative Example 6, substantially the same method as that in Example 3 is applied, and the main difference is that no large particle is added at step (4).

Comparative Example 7

In this comparative example, a lithium transition metal oxide cathode material is prepared. The difference from Example 1 is that only the first additive $LiPO_3$ is added at step (1) so as to obtain the first slurry, the second additive, the third additive and the fourth additive are added simultaneously so as to obtain the second slurry, and a $LiCoO_2$ material coated with $TiO_2$, $Al_2O_3$ and $Al(PO_3)_3$ is obtained by sintering finally.

Test Example

Residual alkali test: tests to the residual alkali on the surface of the coated cathode material obtained in Examples 1 to 3 and Comparative Examples 1 to 7 are conducted, respectively. The test method for the residual alkali is a company-defined method. The specific steps of the test are as follows: a sample of 30.00 g is weighed, a deionized water of 100.00 g is added, a magnet is added, and stirring is performed at a speed of 600 rpm for 30 min, followed by standing for 15 min, suction filtration is performed, the filtrate is transferred to a disposable plastic cup, 50 ml of which is pipetted and is titrated with 0.05 mol/L hydrochloric acid standard solution. Calibration of 0.05 mol/L hydrochloric acid standard solution: sodium carbonate of 3 g that has been dried at 270 degrees Celsius is weighed, deionized water is added to dissolve the sodium carbonate with a constant volume of 500 ml, 10 ml of which is pipetted for calibration, and a calibration result shows the residual lithium content.

Battery preparation: the cathode material, polyvinylidene fluoride, and conductive carbon are mixed in a mass ratio of 90:5:5, N-methylpyrrolidone (NMP) is added, a slurry is made by stirring so as to be coated on an aluminum foil, and a positive electrode sheet is made by drying at 80 degrees Celsius. The prepared positive electrode sheet, the lithium sheet, electrolytic solution and a diaphragm are configured to be raw materials to constitute a CR2430 button battery in a glove box.

Capacity test: 4 parallel samples of the batteries made in Comparative Examples 1 to 7 and Examples 1 to 3 are taken, charged to a voltage of V1 at a constant current in a rate of 0.1 C at room temperature of 25 degrees Celsius, and further charged until the current is lower than 0.05 C under the constant voltage of V1, so as to be in a fully charged state at V1. Then, the batteries are discharged to V2 at a constant current in a rate of 0.1 C, so as to obtain the discharge capacity. The discharge capacity at the in a rate of 0.1 C is obtained by the following calculation formula: discharge gram capacity=discharge capacity/mass of cathode material.

Cycle performance test: it is carried out by a combination of charge, discharge and storage at room temperature 25 degrees Celsius, that is, storage is performed after one charge and one discharge, and then the charge and discharge test is performed again, and this cycle is repeated. Cycle capacity retention ratio=(discharge capacity of 50th cycle/ discharge capacity of first cycle)×100%.

Different lithium transition metal oxides have different requirements for the charge and discharge voltage in the capacity test and the cycle test, which are specifically as follows.

In case that the lithium transition metal oxide is $LiNi_{0.85}Co_{0.10}Mn_{0.05}O_2$, the test of the discharge gram capacity is conducted at the charge-discharge voltage of 3.0 to 4.25 V@a rate of 0.2 C, and the test of the cycle performance is conducted at the charge-discharge voltage of 3.0 to 4.25 V@a rate of 0.1 C, the results of which are shown in Table 1.

TABLE 1

| Number | Charge gram capacity (mAh/g) 4.25 V/ 0.2 C | Discharge gram capacity (mAh/g) 4.25 V/ 0.2 C | CE % | 10th discharge gram capacity (mAh/g) 4.25 V/ 1.0 C | Capacity retention ratio after 50 cycles | Powder compaction density g/cm$^3$ | Residual alkali % |
|---|---|---|---|---|---|---|---|
| Example 3 | 243 | 217.6 | 89.54 | 202 | 98% | 3.6 | 0.0110 |
| Comparative Example 3 | 236 | 212 | 87.70 | 198 | 95% | 3.55 | 0.0220 |
| Comparative Example 6 | 240 | 216.8 | 88.63 | 200 | 97% | 3.36 | 0.0130 |

According to the analysis to Table 1, the residual alkali content of Comparative Example 3 is substantially the same with that of Example 3, which indicates that water washing can effectively reduce the residual alkali content on the surface of the high-nickel lithium nickel cobalt manganese oxide material. Compared with Example 3, the battery capacity and the initial efficiency are reduced, the capacity retention ratio after 50 cycles is significantly reduced, which is mainly because the $Li^+$ added in the process of water washing in Example 3 can inhibit the excessive precipitation of $Li^+$ in the a matrix of the material and stabilize the structure of the matrix, so that the capacity and the initial efficiency remain stable. In addition, due to the presence of double hydrolysis, the surface layer is uniformly coated, and the 50-cycle capacity retention ratio is relatively high. On the contrary, a conventional solid-phase coating is used by the high-nickel lithium nickel cobalt manganese oxide material in Comparative Example 3, which increases the BET of the surface layer, and weakens the ability to inhibit the precipitation of $Li^+$ in the material and reduces the capacity. In addition, due to the precipitation of $Li^+$, more residual alkali is produced, the contact area of which with the electrolytic solution is increased, side reactions are increased, and the cycle performance is decreased. The compaction density of the large-particle powder added in Example 3 and Comparative Example 3 is 3.6 g/cm$^3$ and 3.55 g/cm$^3$, respectively, and no large particle is added in Comparative Example 6 with the compaction density of powder in 3.36 g/cm$^3$, which is significantly lower than those of the samples added with the large particle.

In case that the lithium transition metal oxide is the high-voltage lithium cobalt oxide, the test of the discharge gram capacity is conducted at the charge-discharge voltage of 3.0 to 4.55 V@a rate of 0.1 C, and the test of the cycle performance is conducted at the charge-discharge voltage of 3.0 to 4.65 V@a rate of 0.5 C, the results of which are shown in Table 2.

TABLE 2

| Number | Charge gram capacity (mAh/g) | Discharge gram capacity (mAh/g) 4.55 V/ 0.1 C | CE % | 3th discharge gram capacity (mAh/g) 4.65 V/ 0.5 C | Capacity retention ratio after 50 cycles | Powder compaction density g/cm$^3$ | Residual alkali % |
|---|---|---|---|---|---|---|---|
| Example 1 | 210.1 | 198.6 | 94.52 | 219.1 | 83% | 4.22 | 0.0016 |
| Example 2 | 209.2 | 197.9 | 94.59 | 218.2 | 81% | 4.23 | 0.0012 |
| Comparative Example 1 | 208.6 | 196.6 | 94.24 | 215.6 | 68% | 4.18 | 0.0015 |
| Comparative Example 2 | 210.1 | 198.5 | 94.47 | 219.7 | 50% | 4.01 | 0.0050 |
| Comparative Example 4 | 210.5 | 194.6 | 91.44 | 214.7 | 55% | 4.16 | 0.0080 |

TABLE 2-continued

| Number | Charge gram capacity (mAh/g) | Discharge gram capacity (mAh/g) 4.55 V/ 0.1 C | CE % | 3th discharge gram capacity (mAh/g) 4.65 V/ 0.5 C | Capacity retention ratio after 50 cycles | Powder compaction density g/cm$^3$ | Residual alkali % |
|---|---|---|---|---|---|---|---|
| Comparative Example 5 | 209.6 | 195.6 | 93.32 | 215.1 | 65% | 4.05 | 0.0025 |
| Comparative Example 7 | 210.6 | 196.6 | 93.35 | 216.1 | 69% | 4.09 | 0.0045 |

According to the analysis to Table 2, compared with Example 1, the discharge capacity and the retention ratio after 50 cycles of the product in Comparative Example 1 are both reduced, which is related to the coating mode of the surface of the lithium cobalt oxide material. Mainly due to solid-phase coating, it leads to a non-uniform coating on the surface of the material, a phenomenon of BET being larger, the increasing of side reactions of the electrolytic solution, and lose of lithium salt, which further leads to a decrease in capacity, initial efficiency and cycle performance of the material.

Compared with Example 1, the initial discharge capacity and 3th discharge capacity in Comparative Example 2 are slightly reduced, and the cycle decreases significantly. The reason is that the surface layer lacks the protection of $Al(PO_3)_3$ in a spinel structure, and the stability of the surface layer is weakened, which leads to an increase in residual alkali on the surface layer, side reactions with the electrolytic solution, and the loss of the lithium salt, so that the cycle decreases significantly.

Compared with Example 1, the discharge capacity and retention ratio after 50 cycles of the sample in Comparative Example 4 are both decreased. The reason is that the multi hydrolysis of the surface layer cannot be achieved due to the lack of an $Al_2(PO_4)_3$ sulfuric acid solution, so that the excessive residual alkali cannot be inhibited, and the coating of the surface is damaged, which deteriorates the material performance.

Compared with Example 1, the discharge capacity and retention ratio after 50 cycles of the sample in Comparative Example 5 are both decreased. The reason is that the double hydrolysis of the surface layer cannot be achieved due to the lack of a $TiSO_4$ sulfuric acid solution. Also, the function of Ti is to increase the capacity, and thus the capacity decreases significantly due to the lack of Ti. Due to the presence of $NaAlO_2$ sodium hydroxide solution, $Al_2(SO_4)_3$ sulfuric acid solution and $LiPO_3$ solution, the precipitation of lithium of the sample is inhibited, so that the increase of the residual alkali on the surface is not apparent.

Compared with Example 1, the discharge capacity and retention ratio after 50 cycles of the sample in Comparative Example 7 are both decreased. The reason is that $TIO^{2+}$, $Al^{3+}$, $AlO_2^-$ ionic solutions are hydrolyzed simultaneously under the same condition, and since the various ionic conditions are inconsistent, and the hydrolysis is liable to be incomplete, which makes the ratio of elements on the surface easy unbalance and affects the uniformity and consistency of the coating.

The compaction density of Comparative Examples 2 and 4 in Table 2 are 4.01 and 4.05, respectively. Large particle is added in Examples 1 and 2 and Comparative Examples 1 and 4, and the compaction densities of which are 4.22, 4.23, 4.18 and 4.16, respectively. The compaction density of the sample added with large particle is significantly improved, and thus the energy density is improved.

Figure 5:
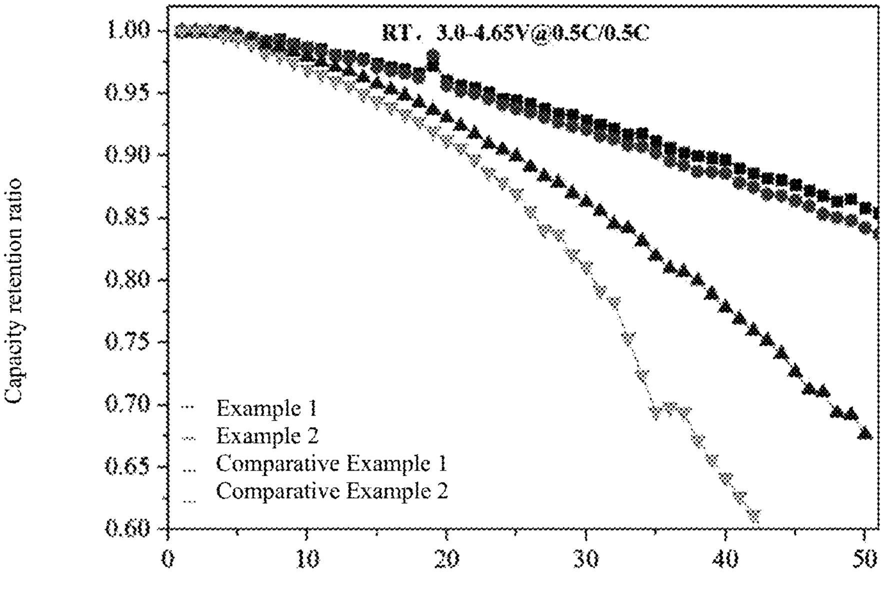
FIG. 5 shows the cycle performance of Example 1, Example 2, Comparative Example 1 and Comparative Example 2.

It can be seen from FIG. 5 that $Li^+$ cationic fusion agent is introduced during the liquid-phase coating of Examples 1 and 2, which effectively inhibits the precipitation of $Li^+$ in the structure of the lithium transition metal oxide powder, effectively reduces the source of residual alkali, and keep the stability of the structure of the matrix of the lithium transition metal oxide powder. Multi polyhydrolysated substances are introduced to form $Al(OH)_3$, $Ti(OH)_4$, $Zr(OH)_4$ and $Al(OH)_2PO_3$ complexes on the surface of the material, which avoids excessive contact time between the material and the water and improve the lack of lattice lithium on the surface. After high-temperature sintering, the hydroxide and complex substances are in in dehydration so as to form a metal oxide or phosphate coating layer, which can effectively reduce the residual alkali content on the surface. In an initial stage of the 3.0 to 4.65 V@0.5 C cycle, the coating substance on the surface may decompose into a substance with a spinel structure, and the substance with the spinel structure has a high-voltage resistance, which improves the capacity retention ratio after 50 cycles of the material. Since the solutions of the Examples 1 and 2 are not adopted by Comparative Examples 1 and 2, the coating of the surface in Comparative Examples 1 and 2 is not dense and has a poor cycle performance.

The examples of the present application have been described in detail above with reference to the attached drawings, but the present application is not limited to the above-described examples, and various changes can be made without departing from the purpose of the present application within the knowledge possessed by those skilled in the art. In addition, in a case of no conflict, the examples of the present application and features in the examples may be combined with each other.

The invention claimed is:

1. A method for surface modification of a lithium transition metal oxide cathode material, comprising the following steps:

S1: adding a first additive, a second additive and a lithium transition metal oxide into water and stirring to obtain a first slurry, wherein the first additive is a lithium-containing phosphate, the lithium-containing phosphate is at least one of lithium-containing orthophosphate or lithium-containing metaphosphate, and the second additive is an acidic solution of $Y^3$+ salt or $Al^1$+ salt;

S2: adding a third additive dropwise into the first slurry and stirring to obtain a second slurry, wherein the third additive is an acidic solution of $TiO^2$+ salt or $ZrO^2$+ salt;

S3: adding a fourth additive dropwise into the second slurry and stirring to obtain a third slurry, wherein the fourth additive is an alkaline solution of $AlO_2$ salt; and S4: centrifuging the third slurry and drying to obtain an intermediate product; mixing the intermediate product with a large-particle cathode material and sintering to obtain a surface-modified lithium transition metal oxide material.

2. The method according to claim 1, wherein an addition amount of the first additive is 0.001 to 0.05% of a mass of the lithium transition metal oxide, a molar ratio of $Li^+$ in the first additive, to $Y^{3+}$ or $Al^{3+}$ in the second additive, to $TiO^{2+}$ or $ZrO^{2+}$ in the third additive, and to $AlO_2^-$ in the fourth additive is (0.1-0.5):(0.5-1.5):(0.5-1.5):(2.5-7.5).

3. The method according to claim 1, wherein a chemical formula composition of the lithium transition metal oxide is $LiCo_xM_{1-x}O_2$, wherein M represents at least one of Mn, Al, Zr, Ti, Mg, La, Ni or Mg, and 1≥x≥0.10.

4. The method according to claim 1, wherein in step S1, a solid-liquid mass ratio of the lithium transition metal oxide to water is 1:(0.2-4).

5. The method according to claim 1, wherein the acidic solution in the second additive and/or the third additive is at least one selected from the group consisting of sulfuric acid solution, hydrochloric acid solution, acetic acid solution, nitric acid solution, citric acid solution or oxalic acid solution.

6. The method according to claim 1, wherein the alkaline solution in the fourth additive is at least one selected from the group consisting of sodium hydroxide solution, potassium hydroxide solution, lithium hydroxide solution or aqueous ammonia solution.

7. The method according to claim 1, wherein a concentration of $Y^{3+}$ or $Al^{3+}$ in the second additive ranges from 0.001 mol/L to 0.4 mol/L; a concentration of $TiO^{2+}$ or $ZrO^{2+}$ in the third additive ranges from 0.002 mol/L to 0.4 mol/L; and a concentration of $AlO_2^-$ in the fourth additive ranges from 0.001 mol/L to 0.3 mol/L.

8. The method according to claim 1, wherein the large-particle cathode material is at least one of lithium cobalt oxide, high-nickel lithium nickel cobalt manganese oxide and low-nickel lithium nickel cobalt manganese oxide; a particle size Dv50 of the large-particle cathode material ranges from 10 μm to 22 μm; and a mass ratio of the intermediate product to the large-particle cathode material is (2-10):1.

9. The method according to claim 1, wherein, in step S4, a temperature for the sintering ranges from 600 degrees Celsius to 950 degrees Celsius; preferably, a time for the sintering ranges from 5 h to 10 h.

* * * * *